US012540052B2

(12) United States Patent
Husmann

(10) Patent No.: US 12,540,052 B2
(45) Date of Patent: Feb. 3, 2026

(54) ELEVATOR SYSTEM

(71) Applicant: Inventio AG, Hergiswil (CH)

(72) Inventor: Josef Husmann, Lucerne (CH)

( * ) Notice: Subject to any disclaimer, the term of this patent is extended or adjusted under 35 U.S.C. 154(b) by 1211 days.

(21) Appl. No.: 17/310,021

(22) PCT Filed: Feb. 4, 2020

(86) PCT No.: PCT/EP2020/052724
§ 371 (c)(1),
(2) Date: Jul. 12, 2021

(87) PCT Pub. No.: WO2020/164965
PCT Pub. Date: Aug. 20, 2020

(65) Prior Publication Data

US 2022/0089407 A1 Mar. 24, 2022

(30) Foreign Application Priority Data

Feb. 12, 2019 (EP) .................................... 19156579

(51) Int. Cl.
*B66B 7/08* (2006.01)
*B66B 1/30* (2006.01)
*B66B 1/32* (2006.01)
*B66B 9/00* (2006.01)

(52) U.S. Cl.
CPC .................. *B66B 7/08* (2013.01); *B66B 1/30* (2013.01); *B66B 1/32* (2013.01); *B66B 9/00* (2013.01)

(58) Field of Classification Search
CPC ........... B66B 5/18; B66B 1/3492; B66B 1/32; B66B 5/16; B66B 5/0031; B66B 11/043; B66B 7/062; B66B 11/0095; B66B 5/24; B66B 11/0293; B66B 7/044
See application file for complete search history.

(56) References Cited

U.S. PATENT DOCUMENTS 5,816,368 A 10/1998 Barrett et al.
2011/0132694 A1 6/2011 Fischer et al.
2016/0152466 A1 6/2016 Dudde et al.

FOREIGN PATENT DOCUMENTS

CN 107000991 A 8/2017
EP 1634842 A2 3/2006
EP 1693331 A1 8/2006
EP 2219985 B1 2/2013
(Continued)

*Primary Examiner* — Marlon T Fletcher
(74) *Attorney, Agent, or Firm* — Schlee IP International, PC; Alexander R. Schlee; Pascal A. Schlee

(57) ABSTRACT

An elevator system includes an elevator car movable in an elevator shaft, a suspension means extending in the elevator shaft, a drive machine associated with the suspension means and a controllable coupling apparatus arranged on the elevator car. The suspension means has a coupling element that the coupling apparatus can be coupled to by assuming a coupled position and from which the coupling apparatus can be uncoupled by assuming an uncoupled position, as a result of which a drive connection between the elevator car and the suspension means can be established and released. The elevator system has a securing device that can assume a securing position and a release position and that, in the securing position, secures the coupling apparatus in the coupled position against leaving the coupled position.

10 Claims, 4 Drawing Sheets

(56) References Cited

FOREIGN PATENT DOCUMENTS

| | | | | | |
|---|---|---|---|---|---|
| JP | 2002080183 | A | | 3/2002 | |
| JP | 2018111570 | A | | 7/2018 | |
| WO | 2018042805 | A1 | | 3/2018 | |
| WO | WO-2019034405 | A1 | * | 2/2019 | ............. B66B 9/003 |
| WO | WO-2020164965 | A1 | * | 8/2020 | ............... B66B 9/00 |
| WO | WO-2020164966 | A1 | * | 8/2020 | ......... B66B 11/0095 |
| WO | WO-2020254399 | A1 | * | 12/2020 | ............... B66B 5/18 |
| WO | WO-2025119764 | A1 | * | 6/2025 | ............... B66B 5/18 |

* cited by examiner

ELEVATOR SYSTEM

FIELD

The invention relates to an elevator system having a controllable coupling device for selectively coupling an elevator car to a suspension means.

BACKGROUND

EP 2219985 B1 describes an elevator system comprising two elevator cars which can be moved in the vertical direction in an elevator shaft, a closed suspension means guided around a lower deflection roller and an upper deflection roller, a drive machine, in the form of an electric motor, that is associated with the suspension means, and a controllable coupling apparatus arranged on each elevator car. The suspension means has a plurality of coupling elements, which can be, for example, in the form of holes or cams. A coupling apparatus of an elevator car can be coupled to and uncoupled from a coupling element, as a result of which a drive connection between the relevant elevator car and the suspension means can be established and released. An elevator car coupled to a suspension means can thus be moved in the first elevator shaft by means of the suspension means, which can be driven by the relevant drive machine.

The elevator cars are moved in only one direction in the mentioned elevator shaft, i.e., only upward or only downward. In order to be able to implement revolving operation of the elevator cars, the elevator system has a further elevator shaft. The elevator cars can be shifted horizontally between the two elevator shafts by means of a transfer apparatus. During operation of the elevator system, an elevator car is coupled to a suspension means at a lower or an upper end position via the coupling apparatus of the elevator car and a coupling element, and is moved upward or downward by the associated drive machine via the suspension means until it has reached the upper or lower end position. There, the elevator car is uncoupled from the suspension means and is shifted horizontally into the other elevator shaft by a transfer apparatus, into the elevator shaft for the other movement direction.

US 2016/152446 A1 also describes such an elevator system.

EP 1693331 A1 describes a similar elevator system in which, in the coupled position, the coupling apparatus can be secured against leaving the coupled position by means of a securing device.

SUMMARY

In contrast, the problem addressed by the invention is in particular that of providing an elevator system which allows particularly reliable and/or safe operation of the elevator system. This problem is solved according to the invention by an elevator system having the features described below.

The elevator system according to the invention has an elevator car which can be moved in an elevator shaft, a suspension means extending in the elevator shaft, a drive machine associated with the suspension means and a controllable coupling apparatus arranged on the elevator car. The coupling apparatus can assume a coupled position and an uncoupled position. The suspension means has a coupling element to which the coupling apparatus can be coupled by assuming the coupled position and from which the apparatus can be uncoupled by assuming the uncoupled position, as a result of which a drive connection between the elevator car and the suspension means can be established and released. The coupled elevator car can be moved in the elevator shaft by means of the suspension means which can be driven by the drive machine.

The elevator system has a securing device which can assume a securing position and a release position. In the securing position, the securing device secures the coupling apparatus in the coupled position against leaving the coupled position. This effectively prevents the coupling apparatus from unintentionally moving from the coupled to the uncoupled position and thus prevents the elevator car from being unintentionally separated from the suspension means. Unintentional separation of the elevator car from the suspension means can lead to the elevator car falling downward in the elevator shaft due to the force of gravity and being stopped by a safety brake when a limit speed is reached. Stopping an elevator car by a safety brake leads in particular to accelerations that are high and therefore unpleasant for passengers in the elevator car. This can also cause minor injuries to passengers. The use of the safety brake can also result in the passengers not being able to leave the elevator car easily, depending on the position of the elevator car in the elevator shaft. In addition, after a safety brake has been used, it is usually necessary to employ a service technician to restart the elevator system. The elevator system is not available until the service technician is on site. In addition, employing a service technician entails effort and thus incurs costs.

The securing device secures the coupling apparatus in the securing position, in particular by means of coupling to the coupling element. However, it is also conceivable for the coupling apparatus, in the securing position, to be coupled to the suspension means. The securing device has, in particular, a controllable and thus movable component on the coupling apparatus and a passive and thus stationary component on the coupling element. This allows simple and inexpensive cabling and power to be supplied to the controllable component of the securing device from the elevator car.

According to the invention, the securing device has a sensor assembly by means of which it is possible to detect whether the securing device is located in the securing position. This allows particularly safe operation of the elevator system.

The sensor assembly can be made, for example, from a combination of a permanent magnet and a Hall sensor. In this case, the permanent magnet is arranged in particular on the coupling apparatus, specifically on a locking end of a lever pivotably mounted on the coupling apparatus. In this case, the Hall sensor is arranged on the coupling element, in particular in the region of a securing recess in the coupling element, such that the sensor detects the permanent magnet only if the locking end of the lever is in the securing recess and thus the securing device is located in the securing position. The Hall sensor is connected in particular to the elevator controller, which evaluates the measured signals from the Hall sensor.

The sensor assembly can also have other types of sensors, for example proximity sensors, by means of which it is possible to detect whether the securing device is located in the securing position.

The elevator system according to the invention also has a control apparatus. The control apparatus is in communication with the sensor assembly and allows the elevator car to be moved only if the sensor assembly detects that the securing device is located in the securing position. This allows particularly safe operation of the elevator system.

The control apparatus can in particular be part of the elevator controller. However, it is also possible for the control apparatus to be independent of the elevator controller, but to be in communication therewith. Moving the elevator car is permitted only if the control apparatus outputs a corresponding release signal. This release signal is output only if the sensor assembly detects that the securing device is located in the securing position. If the elevator car is moved and the release signal is no longer output by the control apparatus, then the movement of the elevator car is ended immediately. The elevator system has in particular more than one elevator car, i.e., two to eight elevator cars, for example, which are basically identical and all have a coupling apparatus. The elevator system has in particular more than one elevator shaft, specifically two elevator shafts, between which the elevator cars can be shifted by means of transfer apparatuses. In particular, a transfer station is arranged at both ends of the elevator shafts, such that revolving operation of the elevator cars is possible. For this purpose, the elevator cars are moved only from bottom to top in a first elevator shaft and only from top to bottom in a second elevator shaft. When the upper or lower end of the relevant elevator shaft is reached, the elevator cars are shifted into the other elevator shaft by means of a transfer station.

The elevator shaft or the elevator shafts are arranged in or on a building and extend mainly in the vertical direction, such that the elevator cars are moved mainly vertically during movement in the elevator shaft.

The suspension means is in particular closed, i.e., annular, for example. It can therefore also be referred to as endless. However, this does not necessarily mean that the suspension means is in the form of a homogeneous ring or consists of only one piece. The suspension means is in particular guided around a lower deflection roller and an upper deflection roller, at least one deflection roller being used as a drive roller or traction sheave, via which the suspension means can be driven by the drive machine associated therewith. The deflection rollers in particular have an effective diameter of less than 100 mm. Such small effective diameters of a deflection roller being used as a traction sheave allow gearless drive of the suspension means that requires little installation space. A tensioning device can in particular be arranged on the suspension means, by means of which tensioning device the necessary suspension-means pretension is generated and deviations in the original length of the closed suspension means and plastic length changes in the suspension means due to operation are compensated for. The required tensioning forces can be generated, for example, by means of tension weights, gas springs or metal springs.

The drive machine is in particular in the form of an electric motor, which is controlled by an elevator controller. The elevator controller controls the entire operation of the elevator system; it therefore controls all controllable components of the elevator system and is connected to switches and sensors of the elevator system. The elevator controller can be in the form of a single central elevator controller or can consist of a plurality of decentralized controllers which are responsible for subtasks. For example, the elevator controller can have a safety controller which ensures the safe operation of the elevator system.

The coupling apparatuses arranged on the elevator car(s) are in particular arranged on a floor or a roof of the elevator cars and are controlled by the above-mentioned elevator controller. The coupling to a coupling element of the suspension means in the coupled position of the coupling apparatus in particular takes place in an interlocking manner, with a frictional coupling also being conceivable. The coupling element in particular has a mainly horizontally oriented recess into which an extendable and retractable bolt of the coupling apparatus can enter in an actuation direction, for example. In this case, the coupling apparatus is in its coupled position when the bolt of the coupling apparatus enters the recess in the coupling element, and in its uncoupled position when the bolt does not enter the recess, or when the recess remains free.

An interlocking or frictional connection between the elevator car and the suspension means can thus be established by the coupling apparatus and the coupling element, such that the elevator car is also moved when the traction means is moved. A drive connection between the elevator car and the suspension means and thus ultimately between the elevator car and the drive machine associated with the suspension means can thus be established and also released again. The coupling apparatuses are in particular controlled such that only one elevator car is coupled to a (single) suspension means, at least during the movement of an elevator car. In particular, only one (single) elevator car is therefore always moved in the shaft by a (single) suspension means.

A coupling element of a suspension means is in particular in the form of a connecting element which connects two free ends of the suspension means to one another. The use of a closed suspension means makes it possible to dispense with a counterweight which has to be guided past the elevator car, and this allows the elevator shaft to have a small cross section. In addition, the coupling element designed in this way fulfills a double function. The coupling element is used to couple the elevator car to the suspension means and to provide the closed suspension means in a simple and cost-effective manner.

The coupling element in particular fulfills the function of what is referred to as a belt joint or a cable connector. A closed suspension means can thus be produced very simply, cost-effectively and reliably from an originally open, elongate suspension means by connecting the two free ends to the coupling element. The coupling element can, for example, have two interconnected suspension-means end connections, which can be designed, for example, in accordance with EP 1634842 A2. The two suspension-means end connections can be connected, for example, via an intermediate piece, to which they can be screwed or welded, for example. The coupling element can also have a single-piece housing.

In an embodiment of the invention, the securing device has an energy store which is designed and arranged such that the securing device can be brought into the securing position by means of the energy store. The energy store is thus intended to bring the securing device into the securing position. This allows particularly safe operation of the elevator system, since the safety device assumes the safety position as standard, i.e., without any other control of an actuator.

An elevator system comprising
- an elevator car that can be moved in an elevator shaft,
- a suspension means extending in the elevator shaft,
- a drive machine associated with the suspension means,
- a controllable coupling apparatus arranged on the elevator car and
- a securing device, in which
- it being possible for the coupling apparatus to assume a coupled position and an uncoupled position, the suspension means having a coupling element to which the coupling apparatus can be coupled by assuming the coupled position and from which the apparatus can be uncoupled by assuming the uncoupled position, as a result of which a drive connection between the elevator car and the suspension means can be established and released, and the coupled elevator car can be moved in the elevator shaft by means of the suspension means, which can be driven by the drive machine, and it being possible for the securing device to assume a securing position and a release position and, in the securing position, the securing device securing the coupling apparatus in the coupled position against leaving the coupled position, and such an energy store can be viewed as an independent invention.

The energy store, which is in particular in the form of a spring, is designed and arranged such that it exerts a restoring force on a component of the safety device, which force pushes the component into a position that it assumes in the safety position. If the coupling apparatus is located in the coupled position and an actuating force of an actuator opposing the restoring force of the energy store does not act on the component, the restoring force exerted by the energy store brings the component into the position that it assumes in the safety position.

As an alternative to providing an energy store, a movable component of the securing device can be designed and arranged in such a way that gravity is intended to bring the component into the position that it assumes in the securing position of the securing device.

In an embodiment of the invention, the securing device has an actuator which is designed and arranged such that the securing device can be brought into the release position by means of the actuator in an activated state. The actuator is therefore intended, in the activated state, to bring the securing device into the release position. This advantageously allows the release position of the securing device to be actively set.

The actuator is designed and arranged in such a way that, in the activated state, it exerts an actuating force on a component of the safety device, which force presses the component into a position that it assumes in the release position. The actuator can be, for example, in the form of an electromagnet or an electric motor, which is controlled in particular by the elevator controller of the elevator system and can thus be activated and deactivated.

In an embodiment of the invention, in the securing position of the securing device, an interlocking connection is established between the coupling apparatus and the coupling element by means of the securing device, in particular by means of a component of the safety device. The coupling apparatus is thus secured particularly reliably in the coupled position.

The interlocking connection is in place at the latest when the coupling apparatus is attempting to leave the coupled position toward the uncoupled position.

In an embodiment of the invention, the securing device has a lever which is pivotably mounted on the coupling device and has a locking end. The lever is designed and arranged in such a way that, in the securing position of the securing device, the locking end of the lever enters a securing recess in the coupling element in such a way that if the coupling device attempts to leave the coupled position, the locking end rests against a stop of the securing recess in the coupling element and the coupling device is thus prevented from leaving the coupled position. This makes it possible to have a particularly effective and at the same time inexpensive securing device.

In this case, the mentioned energy store is in particular in the form of a spring which is designed and arranged such that it exerts a restoring force on the lever, by means of which force the locking end of the lever can be brought toward the securing recess in the coupling element. The energy store has in particular two springs connected in parallel, for example two coaxially arranged spiral springs, an inner spiral spring being arranged in an outer spiral spring. In this way, the energy store still applies a restoring force if one of the two springs is broken.

In this case, the mentioned actuator is in particular in the form of an electromagnet, which is designed and arranged such that it exerts, in the activated state, an actuating force on the lever, by means of which force the locking end of the lever can be brought out of the securing recess in the coupling element.

In an embodiment of the invention, a braking apparatus is arranged on the elevator car, by means of which apparatus the elevator car can be fixed within the elevator shaft independently of the suspension means. This allows particularly safe operation of the elevator system.

The elevator car is fixed, by means of the braking apparatus, in particular with respect to a guide rail permanently installed in the elevator shaft. The guide rail can also be referred to as a vertical guide rail. For this purpose, the braking apparatus can, for example, have one or more brake shoes which, when the braking apparatus is in an activated state, press against the guide rail in such a way that the elevator car is prevented from being moved in the elevator shaft. The braking apparatus is in particular also controlled by the elevator controller. In particular, the apparatus is always activated when the coupling apparatus of the corresponding elevator car is located in the uncoupled position.

In an embodiment of the invention, the control apparatus allows the braking apparatus to be released only if the sensor apparatus detects that the securing device is located in the securing position. The control apparatus also causes, in particular, the braking apparatus to be activated, i.e., the elevator car to be fixed in the elevator shaft, as soon as the sensor assembly detects that the securing device is not located in the securing position. This allows particularly safe operation of the elevator system.

Release of the braking apparatus of the elevator car is permitted only if the control apparatus outputs a corresponding release signal. This release signal is output only if the sensor assembly detects that the securing device is located in the securing position. If the braking apparatus is released, for example while the elevator car is being moved, and the release signal is no longer output by the control apparatus, then the braking apparatus is activated immediately and the elevator car is thus fixed in the elevator shaft.

Further advantages, features and details of the invention will become apparent from the following description of embodiments and from the drawings, in which identical or functionally identical elements are provided with identical reference signs. The drawings are merely schematic and not to scale.

DETAILED DESCRIPTION

Figure 1:
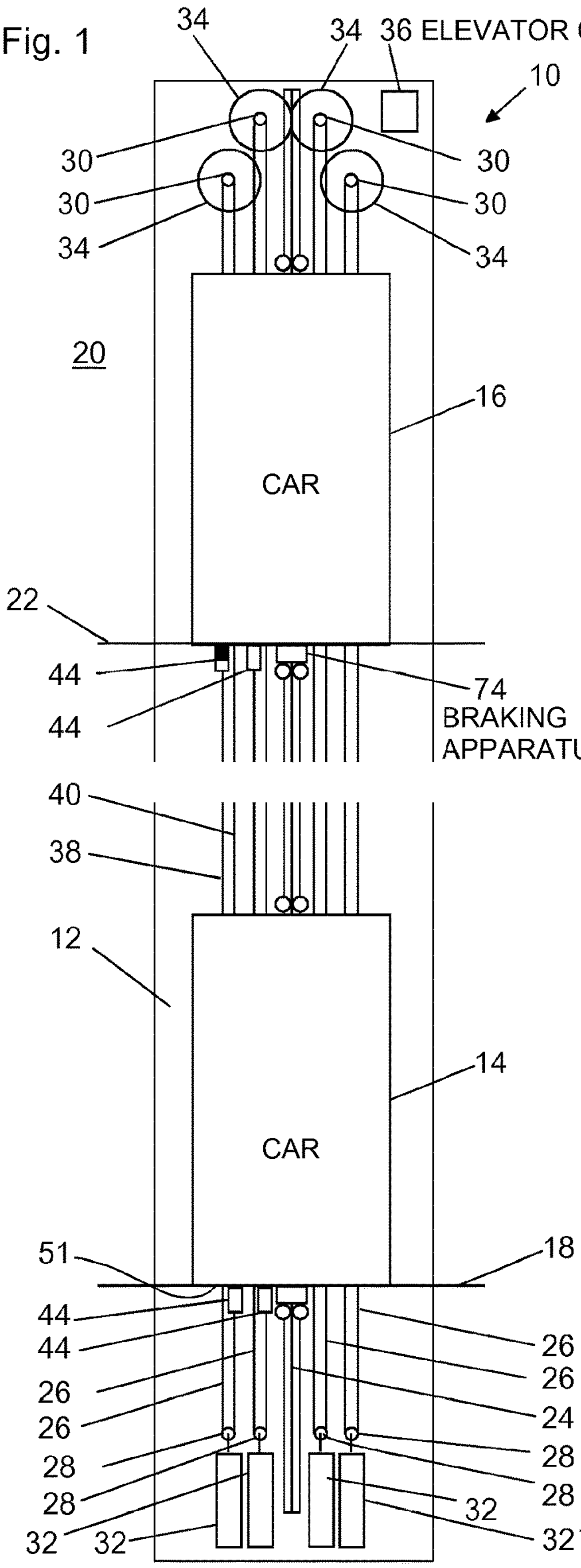
FIG. 1 shows a first elevator shaft of an elevator system comprising a first and a second elevator car.

According to FIG. 1, an elevator system 10 has a first elevator shaft 12 in which a first elevator car 14 and a second elevator car 16 are arranged. The first elevator car 14 is located at a lower end position 18 which corresponds to a position of the elevator car 14 at a lowermost floor of the building 20 having the elevator system 10. The second elevator car 16 is located at an upper end position 22 which corresponds to a position of the elevator car 16 at an uppermost floor of the building 20. Between the lower end position 18 and the upper end position 22 there is a number of floors which are not shown in FIG. 1.

The elevator system 10 has a vertical guide rail 24 which extends in the vertical direction and on which the elevator cars 14, 16 are guided during movement in the elevator shaft 12. In order to move the elevator cars 14, 16 in the elevator shaft 12, the elevator system 10 has a total of eight closed suspension means 26, of which four suspension means 26 are shown in FIG. 1. The suspension means 26 are in the form of belts and are each guided around a lower deflection roller 28 and an upper deflection roller 30.

The two deflection rollers 28, 30 of a suspension means 26 are arranged vertically one above the other such that the suspension means 26 extend vertically between the deflection rollers 28, 30. The deflection rollers 28, 30 in particular have an effective diameter of less than 100 mm. The lower deflection rollers 28 are arranged below the first elevator car 14 and are each connected to a tension weight 32. The tension weight 32 acts as a tensioning device, by means of which the necessary suspension-means pretension is generated and deviations in the original length of the closed suspension means 26 and plastic length changes in the suspension means 26 due to operation are compensated for.

The upper deflection rollers 30 are arranged above the second elevator car 16 and each act as a traction sheave for a drive machine 34 in the form of an electric motor. Each suspension means 26 is associated with a drive machine 34, by means of which the suspension means 26 can be driven and moved. The drive machines 34 are controlled by a control apparatus in the form of an elevator controller 36, which controls all of the actuators of the elevator system 10.

Figure 2:
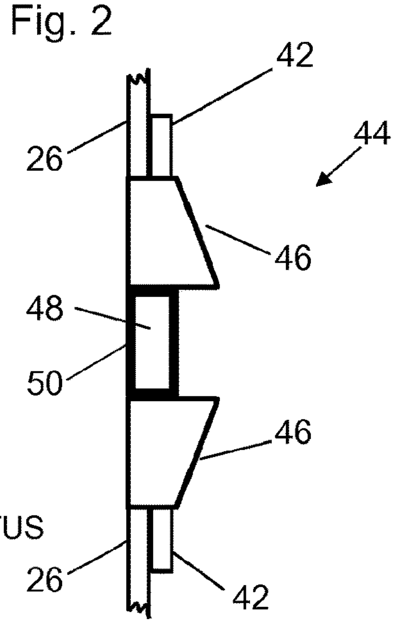
FIG. 2 is an enlarged view of a coupling element of a suspension means from FIG. 1.

Each suspension means 26 consists of two suspension-means parts 38, 40, the free ends 42 of which are connected by means of two coupling elements 44 (shown in an enlarged view in FIG. 2). The coupling element 44 consists of two suspension-means end connections 46 which are oriented in opposite directions and are connected to a connecting element 50 having a recess 48. The suspension-means end connections 46 can be designed, for example, in accordance with the suspension-means end connections described in EP 1634842 A2. An extendable bolt 60 (see FIGS. 4-7) of a coupling apparatus 58 (see FIGS. 4-7) arranged on an elevator car 14, 16 can enter the recess 48, as a result of which the coupling apparatus 58 couples to the coupling element 44. The coupling apparatus 58 is then located in a coupled position (see also FIGS. 6 and 7). The bolt 60 can be secured in the coupled position of the coupling apparatus 58 by a securing device (80 in FIGS. 5-7) (not shown in FIG. 1). The coupling apparatus 58 can be uncoupled from the coupling element 44 by pulling the bolt 60 out of the recess 48. The coupling apparatus 58 is then located in an uncoupled position (see also FIG. 5). The coupling apparatuses 58 are arranged on a floor 51 of the elevator cars 14, 16 and are described in more detail in connection with FIG. 4. A coupling element 44 to which a coupling apparatus 58 has been coupled has a solid square in the drawings. In FIG. 1, the second elevator car 16 is thus connected via a coupling element 44 to the suspension means 26 arranged on the far left in FIG. 1.

It is also possible for the coupling apparatuses to be arranged on the roof of an elevator car. The positions of the coupling elements on the suspension means then have to be adapted accordingly.

As soon as an elevator car 14, 16 is coupled to a coupling element 44 via a coupling apparatus 58 associated with the elevator car, a drive connection is established between the elevator car 14, 16 and the suspension means 26. In this coupled state, the elevator car 14, 16 is carried along by the suspension means 26 and is thus moved in the elevator shaft 12 when the suspension means 26 is driven or moved by the drive machine 34 associated therewith. In the state shown in FIG. 1, the second elevator car 16 can thus be moved in the elevator shaft 12. Since the first elevator car 14 in FIG. 1 is not coupled to any suspension means 26, movement of the first elevator car 14 in the elevator shaft 12 is not possible in the state in FIG. 1.

The elevator cars 14, 16 each have a braking apparatus 74, by means of which the elevator cars can be fixed to the vertical guide rail 24 and thus within the elevator shaft 12.

Figure 3:
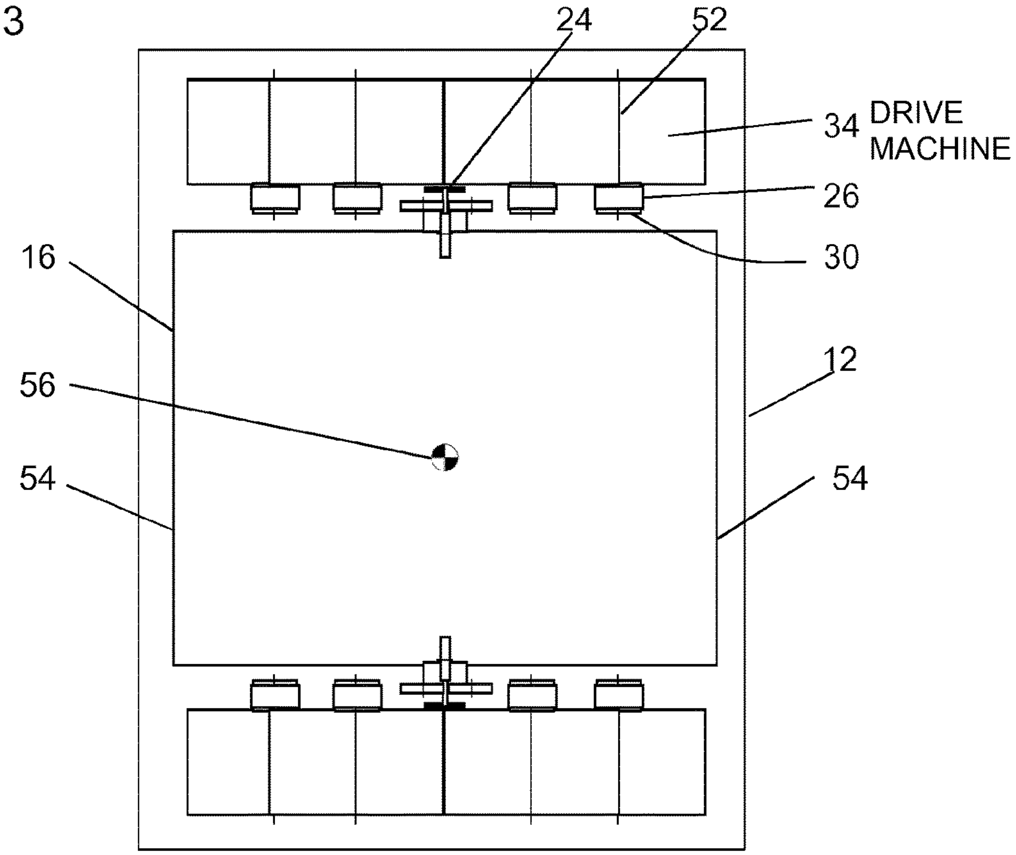
FIG. 3 is a view from above of the first elevator shaft having a total of eight drive machines.

FIG. 3 is a view from above of the first elevator shaft 12 having a total of eight drive machines 34. The drive machines 34 are each drive-connected to a traction sheave in the form of a deflection roller 30, over which a suspension means 26 extends. For reasons of clarity, the reference signs are shown only once in FIG. 3. Four drive machines 34 are arranged on each opposite side of the elevator car 16, two drive machines 34 being arranged on different sides of the vertical guide rail 24 on each of the opposite sides of the elevator car 16. Drive axles 52 of the drive machines 34 extend in parallel with one another, a drive machine 34 on one side of the elevator car 16 in each case being arranged coaxially with respect to a drive machine 34 on the other side of the elevator car 16. A car door (not shown) of the elevator car 16 is located on one or both free sides 54 of the elevator car 16, on which no drive machines 34 are arranged.

The elevator controller 36 (see FIG. 1) always controls two drive machines 34 on opposite sides in the same manner or synchronously, such that the suspension means 26 associated with the drive machines also move or are moved synchronously. Two drive machines 34 which are arranged diagonally with respect to a center of gravity 56 of the elevator car, i.e., the upper drive machine 34 on the far left-hand side and the lower drive machine 34 on the far right-hand side in FIG. 3, for example, are always controlled in the same manner. Thus, by means of the eight drive machines 34, a total of four elevator cars 14, 16 can be moved simultaneously and independently of one another in the first elevator shaft 12.

Figure 4:
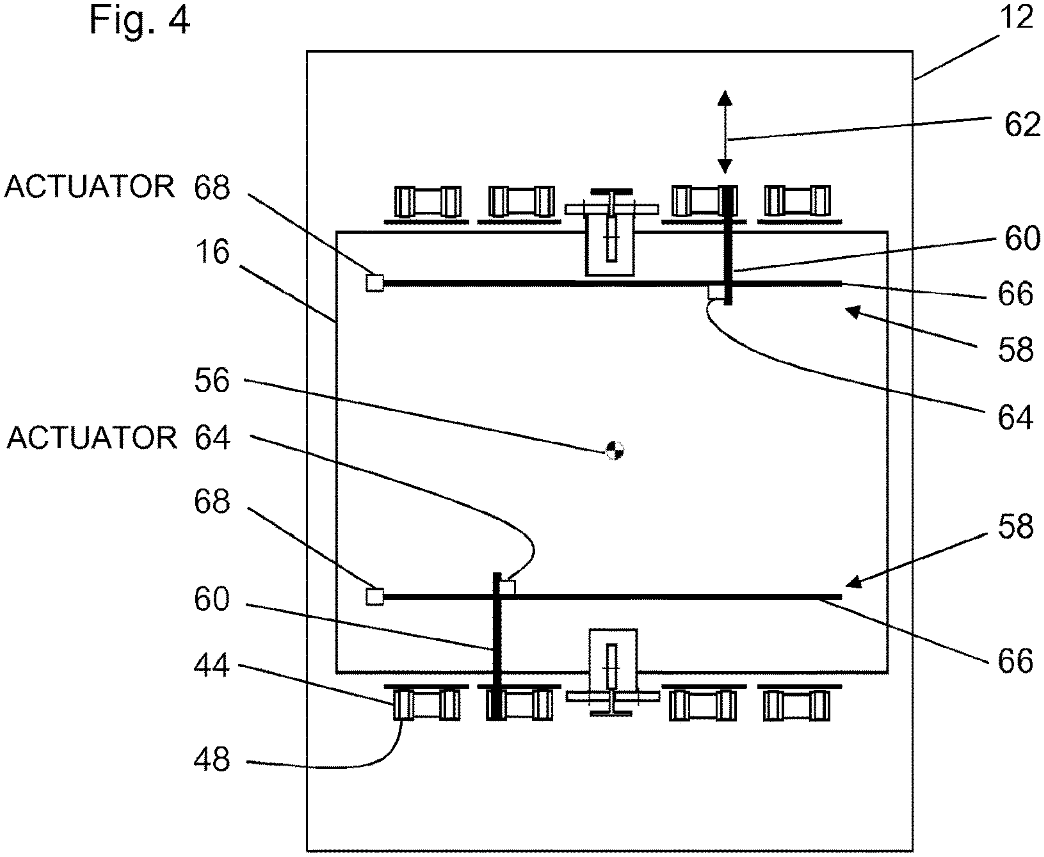
FIG. 4 is a view from below of an elevator car having two coupling apparatuses for coupling to coupling elements of the suspension means.

FIG. 4 is a view from below of the elevator car 16 having two coupling apparatuses 58 for coupling to coupling elements 44 of the suspension means 26. The coupling apparatuses 58 are each arranged opposite the drive machines 34 (not shown in FIG. 4) and thus opposite the coupling elements 44 of the suspension means 26. Each coupling apparatus 58 has a bolt 60 which can be extended and retracted in an actuation direction 62 which is oriented in the direction of the coupling elements 44. In order to extend and retract the bolt 60, the coupling apparatus 58 has an actuating actuator 64, which can be, for example, in the form of an electric motor. In order to position the bolt 60 relative to the coupling elements 44, the bolt 60, together with the actuating actuator 64, can be moved horizontally and perpendicularly relative to the actuation direction 62 along a rail 66 by means of a positioning actuator 68, which is also in the form of an electric motor, for example.

In order to couple a coupling apparatus 58 and thus the elevator car 16 to a coupling element 44 and thus to a suspension means 26, the bolt 60 is first correctly positioned with respect to the corresponding coupling element 44. The bolt 60 is then extended, as a result of which the bolt 60 enters the recess 48 in the coupling element 44. An interlocking connection is thus established between the coupling apparatus 58 and the coupling element 44, and thus between the elevator car 16 and the suspension means 26. When this interlocking connection is established, the elevator car 16 can be moved in the elevator shaft 12.

As already described in connection with FIG. 3, the elevator car 16 is always coupled to two suspension means 26 which are arranged diagonally with respect to the center of gravity 56 of the elevator car. This is achieved by the elevator car 16 always being coupled to coupling elements 44 which are arranged diagonally with respect to the center of gravity 56 of the elevator car 16.

It is also possible that the bolts of the coupling apparatuses cannot be shifted. In this case, the coupling apparatuses have separate bolts for each coupling element, or a coupling apparatus is associated with exactly one coupling element and thus exactly one suspension means.

The drive machines and thus the suspension means can also be arranged on a side of the elevator cars that is opposite the car door and thus the shaft doors. In this case, an elevator car in particular has only one coupling apparatus, such that an elevator car is coupled to only one suspension means for movement in the elevator shaft.

In addition to a first elevator shaft 12, the elevator system 10 has a second elevator shaft (not shown) which is arranged in parallel with the first elevator shaft 12. The second elevator shaft is designed analogously to the first elevator shaft 12. The movement of the elevator cars 14, 16 in the second elevator shaft is carried out analogously to the movement in the first elevator shaft 12. In the first elevator shaft 12, the elevator cars 14, 16 are moved only upward and in the second elevator shaft only downward.

In order to be able to implement revolving operation of the elevator cars in the two elevator shafts, the elevator system 10 has two transfer apparatuses (not shown), by means of which the elevator cars 14, 16 can be moved from the first elevator shaft to the second elevator shaft or from the second elevator shaft to the first elevator shaft. The transfer apparatuses can in particular be designed in accordance with the transfer apparatuses in the form of horizontal displacement units from EP 2219985 B1.

Figure 5:
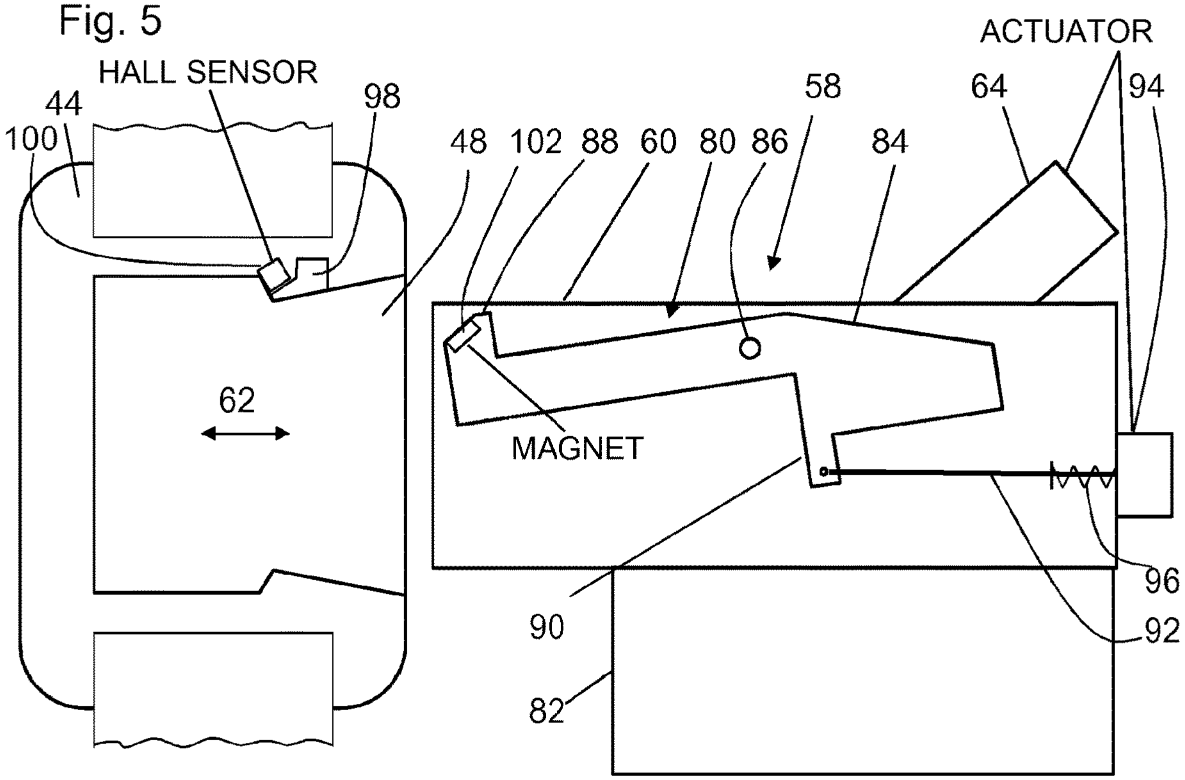
FIG. 5 is an enlarged view of a coupling element, a coupling apparatus in an uncoupled position and a securing device in a release position.

The securing device 80 and its mode of operation will be described in more detail using FIGS. 5-7. The coupling apparatus 58 has a carrier 82 which is permanently fixed to an elevator car (not shown). The apparatus has the bolt 60 which has a cuboid basic shape and which can be shifted, by the actuating actuator 64, with respect to the carrier 82 in the horizontal direction, and can thus be retracted and extended with respect to the coupling element 44. To this end, the actuating actuator 64 is activated by the elevator controller 36. The coupling apparatus 58 is positioned with respect to the coupling element 44 in such a way that the bolt 60, when extended toward the coupling element 44, can enter the recess 48 in the coupling element 44. The recess 48 has a funnel-shaped portion in the direction of the coupling apparatus 58, which portion guides the bolt 60 when it enters the recess 48.

The securing device 80 has components which are arranged both on the coupling apparatus 58 and on the coupling element 44. A lever 84 is pivotably mounted on the bolt 60 of the coupling apparatus 58. The pivot axis 86 of the lever extends horizontally and perpendicularly to the actuation direction 62. In this way, a hook-shaped locking end 88 of the lever 84 oriented toward the coupling element 44 can be pivoted upward and downward. In order to pivot the lever 84, the lever is connected at an extension 90 to an actuating rod 92. The extension 90 lies, with respect to the pivot axis 86, opposite and below the locking end 88. The locking end 88 is thus pivoted upward when the extension 90 and the actuating rod 92 move toward the coupling element 44 and pivoted downward when the extension 90 and the actuating rod 92 move away from the coupling element 44. The actuating rod 92 can be pulled away from the coupling element 44 by an actuator in the form of an electromagnet 94. The force applied by the electromagnet 94 can be referred to as the actuation force. The electromagnet 94 is arranged at an end of the bolt 60 opposite the coupling element 44 and is also activated by the elevator controller 36. A force of an energy store in the form of a helical spring 96 arranged around the actuating rod 92 acts on the actuating rod 92 in the direction of the coupling element 44. This force can be referred to as the restoring force. The helical spring 96 is designed such that the force applied by the spring is smaller than the force that can be applied by the electromagnet 94. The electromagnet 94 can thus be controlled in such a way that it pulls the actuating rod 92 away from the coupling element 44 against the force of the helical spring 96, and thus brings the lever 84 into the position shown in FIGS. 5 and 6 and holds the lever. This position is referred to as the release position of the lever 84 and thus of the securing device 80. When the electromagnet 94 is not active and thus does not exert any force on the actuating rod 92, the actuating rod 92 is pressed by the helical spring 96 toward the coupling element 44 and the lever 84 is thus brought into the position shown in FIG. 7 and held. This position is referred to as the securing position of the lever 84 and thus of the securing device 80.

Instead of a helical spring, the energy store can also have two springs connected in parallel, for example two coaxially arranged helical springs, an inner helical spring being arranged in an outer helical spring.

The coupling element 44 has a securing recess 98 at the top in the funnel-shaped region of the recess 48. The securing recess 98 is shaped such that it can receive the locking end 88 of the lever 84. In the region of the securing recess 98, a Hall sensor 100 is arranged such that it detects a permanent magnet 102 arranged on the securing end 88 of the lever 84 when the locking end 88 has completely entered the securing recess 98. The Hall sensor 100 is in communication with the elevator controller 36. The Hall sensor 100 and the permanent magnet 102 thus together form a sensor assembly 101.

The coupling of the coupling apparatus 58 to the coupling element 44 is described in more detail below using the views in FIGS. 5-7. In FIG. 5, the elevator car is fixed in the elevator shaft by means of the braking device. The bolt 60 is located in a retracted position such that it is at a horizontal distance from the coupling element 44. The coupling apparatus 58 is thus in the uncoupled position. The electromagnet 94 is activated or energized such that it holds the actuating rod 92 in a position pulled away from the coupling element 44 and the lever 84 is thus located in the release position. The securing device 80 is thus also in the release position.

In order to couple the coupling apparatus 58 to the coupling element 44, the bolt 60 is pushed by the actuating actuator 64 into the recess 48 in the coupling element 44. This coupled position of the coupling apparatus 58 is shown in FIG. 6. The electromagnet 94 is still energized in FIG. 6, so that the securing device 80 is still located in the release position as in FIG. 5. The Hall sensor 100 thus does not detect the permanent magnet 102 at the locking end 88 of the lever 84 in FIG. 6.

The coupling apparatus 58 could also be brought into the coupled position when the securing device is located in the securing position. In this case, the locking end 88 would be pressed downward in the funnel-shaped region of the recess 48 in the coupling element 44. The end has a corresponding bevel for this purpose.

In order to secure the coupling apparatus 58 in the coupled position against leaving this position, the electromagnet 94 is deactivated and therefore no longer energized. The lever 84 is thus pivoted by the helical spring 96 into its securing position, as described above, and held there. The securing device 80 is thus also brought into the securing position and held there. This state is shown in FIG. 7. The securing end 88 has thus completely entered the securing recess 98, as a result of which the securing device 80 is located in the securing position. If the bolt 60 now attempts to move away from the coupling element 44, and the coupling apparatus 58 thus attempts to leave the coupled position, then the locking end 88 of the lever 84 rests against a stop 104 of the securing recess 98, and this makes further movement of the bolt 60 away from the coupling element 44 impossible. In the securing position of the safety device 80, there is thus an interlocking connection between the coupling apparatus 58 and the coupling element 44. This prevents the coupling apparatus 58 from leaving the coupled position and secures the coupling apparatus 58 against leaving the coupled position.

Figure 7:
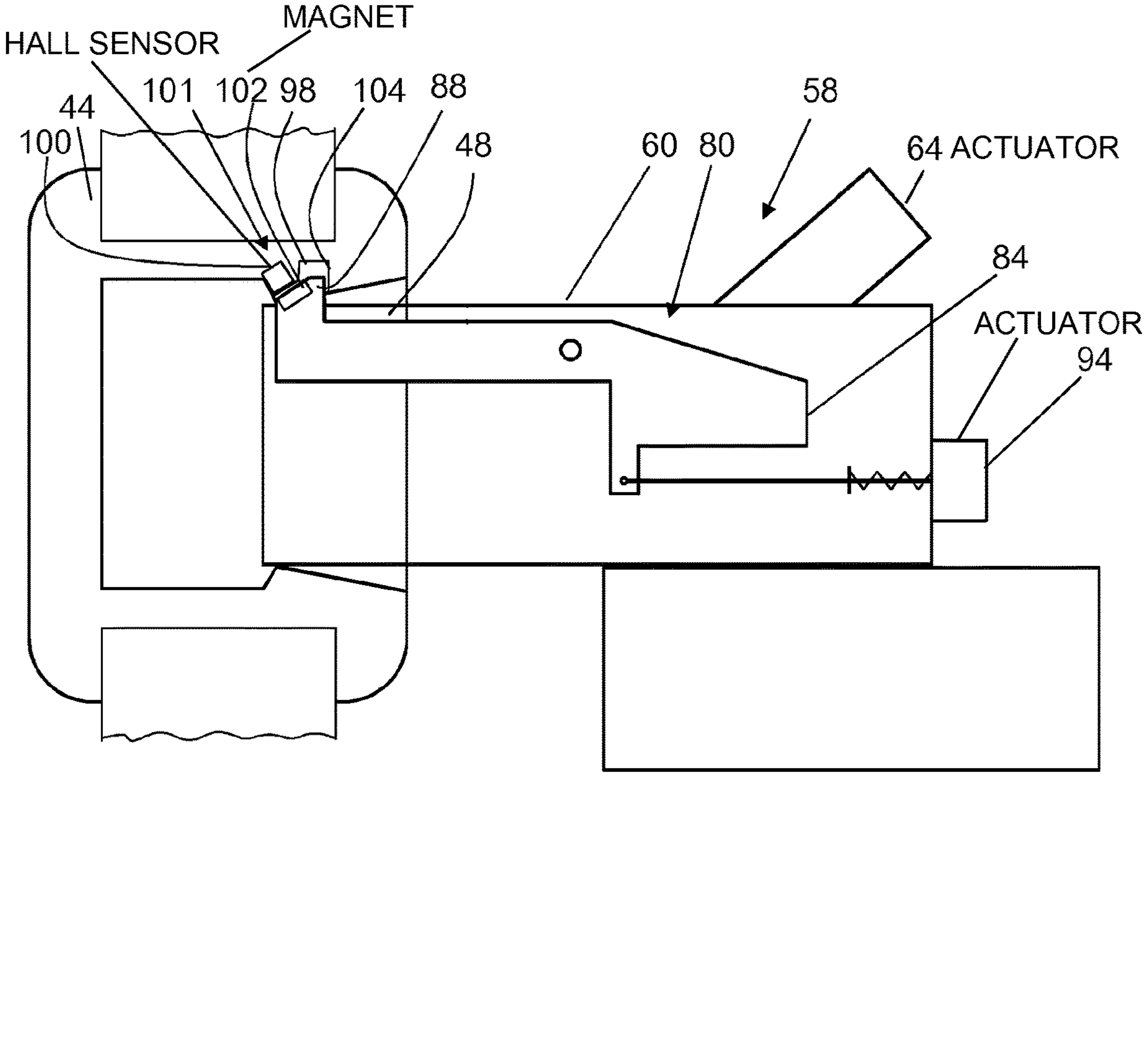
FIG. 7 is a view analogous to FIGS. 5 and 6 with the coupling apparatus in the coupled position and the securing device in a securing position.

In the position of the securing end 88 of the lever 84 shown in FIG. 7, the Hall sensor 100 detects the permanent magnet 102 at the locking end 88 of the lever 84 and forwards this information to the elevator controller 36. The sensor assembly 101 thus detects that the securing device 80 is located in the securing position. Only when the elevator controller 36 has received this information does it allow the braking apparatus of the elevator car to be released and the elevator car to be moved. The brake of the elevator car can therefore only be released and the elevator car can only be moved when the securing device 80 assumes the securing position shown in FIG. 7. If the elevator controller 36 detects, during movement of the elevator car or also when an elevator car is at a standstill, and on the basis on the information from the sensor assembly 101, that the securing device 80 is not located in the securing position, it immediately activates the braking apparatus of the elevator car.

Figure 6:
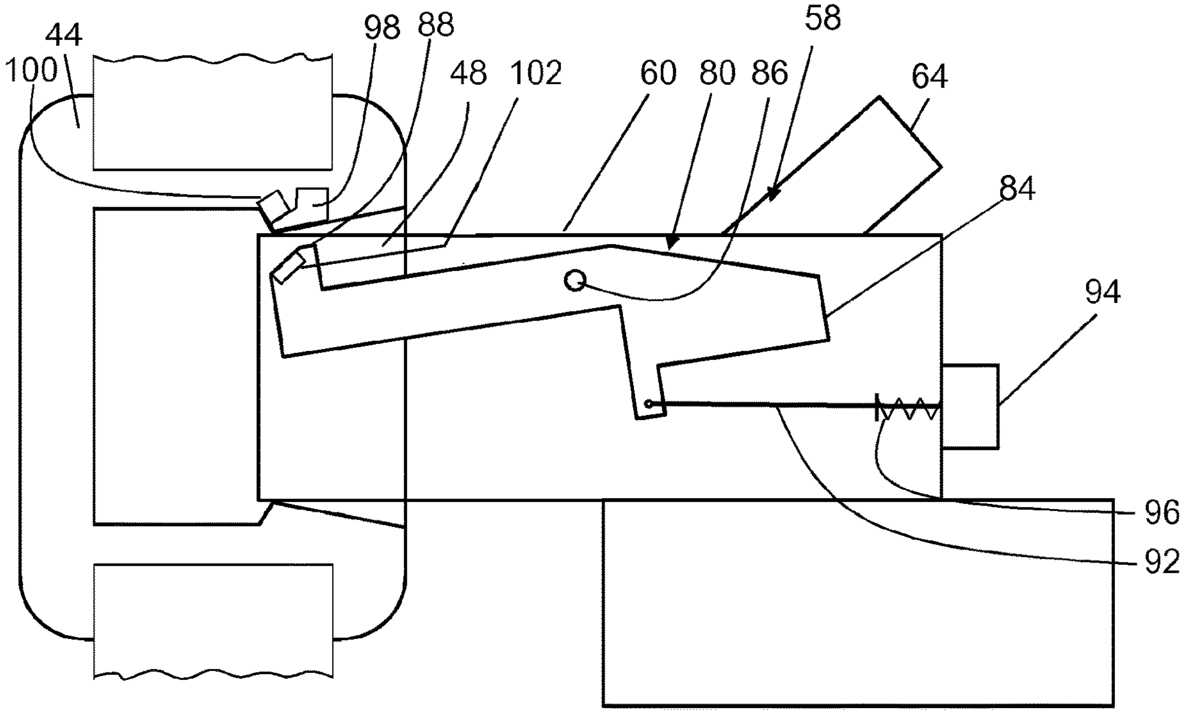
FIG. 6 is a view analogous to FIG. 5 with the coupling apparatus in a coupled position and the securing device still in the release position.

In order to bring the coupling apparatus 58 from the coupled position into the uncoupled position, the braking apparatus is first activated and then the securing device is brought into the release position by activating the electromagnet 94 (corresponding to FIG. 6). The bolt 60 of the coupling apparatus 58 can then be pulled out of the recess 48 in the coupling element 44 and the coupling apparatus 58 can thus be brought into the uncoupled position.

Finally, it must be noted that terms such as "having," "comprising," etc. do not preclude other elements or steps and terms such as "a" or "an" do not preclude a plurality. It must further be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system comprising:

an elevator car movable in an elevator shaft;

a suspension means extending in the elevator shaft;

a drive machine associated with the suspension means;

a controllable coupling apparatus arranged on the elevator car and being operable between a coupled position and an uncoupled position;

a securing device;

wherein the suspension means has a coupling element to which the coupling apparatus is coupled in the coupled position and from which the coupling apparatus is uncoupled in the uncoupled position to respectively establish and release a drive connection between the elevator car and the suspension means, and when drive connection is established the elevator car is movable in the elevator shaft by the suspension means driven by the drive machine;

wherein the securing device is operable between a securing position and a release position and, when in the securing position, the securing device secures the coupling apparatus in the coupled position against leaving the coupled position; and wherein the securing device has a sensor assembly that detects whether the securing device is located in the securing position, and wherein the elevator system has a control apparatus in communication with the sensor assembly, the control apparatus allowing the elevator car to be moved in the elevator shaft only when the sensor assembly detects that the securing device is located in the securing position.

2. The elevator system according to claim 1 wherein the securing device includes an energy store that is adapted and arranged to bring the securing device into the securing position.

3. The elevator system according to claim 1 wherein the securing device includes an actuator that is adapted and arranged to bring the securing device into the release position when the actuator is activated.

4. The elevator system according to claim 1 wherein the securing device when in the securing position establishes an interlocking connection between the coupling apparatus and the coupling element.

5. The elevator system according to claim 1 wherein the securing device includes a lever pivotably mounted on the coupling apparatus, the lever having a locking end that is adapted and arranged such that, in the securing position of the securing device, the locking end enters a securing recess formed in the coupling element wherein when the coupling device attempts to leave the coupled position, the locking end rests on a stop of the securing recess preventing the coupling device from leaving the coupled position.

6. The elevator system according to claim 5 wherein the securing device includes an energy store that is adapted and arranged to bring the securing device into the securing position, the energy store being a spring that exerts a restoring force on the lever that forces the locking end of the lever toward the securing recess.

7. The elevator system according to claim 6 wherein the securing device includes an actuator that is adapted and arranged to bring the securing device into the release position when the actuator is activated, the actuator being an electromagnet that, when activated, exerts an actuating force on the lever to force the locking end out of the securing recess.

8. The elevator system according to claim 7 including a braking apparatus arranged on the elevator car for fixing the elevator car within the elevator shaft independently of the suspension means.

9. The elevator system according to claim 8 wherein the control apparatus allows the braking apparatus to be released only when the sensor assembly detects that the securing device is located in the securing position.

10. The elevator system according to claim 9 wherein the control apparatus causes the braking apparatus to be activated as soon as the sensor assembly detects that the securing device is not located in the securing position.

* * * * *